(12) United States Patent
Moeller et al.

(10) Patent No.: US 10,104,471 B2
(45) Date of Patent: Oct. 16, 2018

(54) TACTILE BASS RESPONSE

(71) Applicant: Google Inc., Mountain View, CA (US)

(72) Inventors: Jonathan Brandt Moeller, Mountain View, CA (US); Zohair Hyder, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/364,922

(22) Filed: Nov. 30, 2016

(65) Prior Publication Data

US 2018/0152786 A1    May 31, 2018

(51) Int. Cl.
*H04B 3/00*     (2006.01)
*H04R 3/04*     (2006.01)
*G06F 3/16*     (2006.01)

(52) U.S. Cl.
CPC .............. *H04R 3/04* (2013.01); *G06F 3/165* (2013.01); *H04R 2400/03* (2013.01); *H04R 2430/03* (2013.01)

(58) Field of Classification Search
CPC .............. H04R 2227/005; H04R 27/00; H04R 2227/003; H04R 3/12; H04R 5/04; H04R 2420/03; H04R 2420/07; H04R 29/00; H04R 29/001; H04R 3/00; H04R 1/1041; H04R 1/1075; H04R 29/007; H04R 5/033; H04R 2201/107; H04R 2430/01; H04N 21/41407; H04N 21/41422; H04N 21/42203; H04N 21/4398; H04N 21/44008; H04N 21/4524; H04N 21/6125; H04N 21/85406; G10K 2210/1081; G10K 11/175; G10K 11/1786; G10K 2210/3028; G10K 2210/3055; G10K 2210/51

(Continued)

(56) References Cited

U.S. PATENT DOCUMENTS 7,295,809 B2 * 11/2007 Moore .................... H04R 3/14
                                                                  381/111
8,743,284 B2    6/2014 Russell et al.
(Continued)

FOREIGN PATENT DOCUMENTS

EP    1615464    1/2006
EP    2818976    12/2014
(Continued)

OTHER PUBLICATIONS

International Search Report for PCT/US2017/054437 dated Nov. 23, 2017, 15 pages.

*Primary Examiner* — Lao Lun-See
(74) *Attorney, Agent, or Firm* — Dority & Manning, P.A.

(57) ABSTRACT

Example aspects of the present disclosure are directed to providing tactile bass response by a user device. For instance, a first audio signal can be caused to be output by a first user device and a second user device. A playback delay can be determined between the output of the first audio signal by the first user device and the output of the first audio signal by the second user device. At a first time, the second user device can be caused to output a second audio signal. The first user device can be caused to execute a tactile bass response representation associated with the second audio signal, such that the tactile bass response is executed at a second time, the second time being determined based at least in part on the temporal delay.

19 Claims, 4 Drawing Sheets

(58) Field of Classification Search
USPC ....... 381/77, 1–3, 61, 119, 74, 300, 309, 98, 381/150, 151; 700/94; 455/3.06
See application file for complete search history.

(56) References Cited

U.S. PATENT DOCUMENTS

| | | | |
|---|---|---|---|
| 8,892,233 B1* | 11/2014 | Lin | H04R 1/1091 |
| | | | 700/94 |
| 9,338,391 B1* | 5/2016 | Greene | H04N 21/4307 |
| 2004/0014426 A1 | 1/2004 | Moore | |
| 2007/0087686 A1 | 4/2007 | Holm et al. | |
| 2008/0205666 A1 | 8/2008 | Tanghe | |
| 2009/0231276 A1 | 9/2009 | Ullrich et al. | |
| 2014/0270196 A1 | 9/2014 | Braho et al. | |
| 2014/0323036 A1* | 10/2014 | Daley | H04H 20/08 |
| | | | 455/3.06 |
| 2015/0070147 A1 | 3/2015 | Cruz-Hernandez et al. | |
| 2015/0113058 A1* | 4/2015 | Zhang | H04L 65/403 |
| | | | 709/204 |
| 2015/0237440 A1 | 8/2015 | Fromel et al. | |
| 2016/0259528 A1* | 9/2016 | Foss | G06F 3/0482 |
| 2016/0337734 A1 | 11/2016 | Efrati | |
| 2018/0115797 A1* | 4/2018 | Wexler | H04N 21/41407 |

FOREIGN PATENT DOCUMENTS

| | | |
|---|---|---|
| EP | 3002958 | 4/2016 |
| EP | 3040810 | 7/2016 |
| WO | WO 2010/013180 | 2/2010 |
| WO | WO 2010/093913 | 8/2010 |
| WO | WO 2012177572 | 12/2012 |
| WO | WO 2014/031756 | 2/2014 |

\* cited by examiner

TACTILE BASS RESPONSE

FIELD

The present disclosure relates generally to providing tactile bass response by a user device.

BACKGROUND

User computing devices can be communicatively coupled to one or more audio output devices to facilitate output of audio signals by the audio output devices. For instance, a user computing device can be in communication with a speaker device, headset, headphones, wireless earbuds, or other suitable audio output device capable of outputting audio signals. Such audio output devices, such as portable audio output devices (e.g. headset, headphones, or other wearable audio components) may suffer from an inability to provide a sufficient bass response associated with an outputted audio signal. For instance, an audio output device may be unable to provide a sufficient tactile bass response; the physiological sensation felt by a user when listening to an audio output. Further, such audio output device may provide significant amount of power to generate low bass tones, which can reduce battery life of the audio output device.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of a computer-implemented method of providing tactile bass response to one or more user devices. The method includes causing, by one or more processors, a first user device to output a first audio signal, and causing a second user device to output the first audio signal. The method further includes determining, by the one or more processors, a playback delay between the output of the first audio signal by the first user device and the output of the first audio signal by the second user device. The method further includes, at a first time, causing, by the one or more processors, the second user device to output a second audio signal. The method further includes causing, by the one or more processors, the first user device to execute a tactile bass response representation associated with the second audio signal, such that the tactile bass response is executed at a second time, the second time being determined based at least in part on the temporal delay.

Other example aspects of the present disclosure are directed to systems, apparatus, tangible, non-transitory computer-readable media, user interfaces, memory devices, and electronic devices for providing a tactile bass response by a user device.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing, by a user device, tactile bass response associated with an audio signal. For instance, a first user device can be configured to provide a tactile bass response associated with an audio signal output by a second user device. The first user device can be any suitable user device capable of providing audio output of an audio signal and/or capable of providing a haptic signal using one or more haptic actuators. For instance, the first user device can be a smartphone, tablet, wearable computing device (e.g. smart watch, fitness band, smart garment, etc.), haptic signal generation device, and/or other suitable device. The second user device can be any suitable user device capable communicating with the first user device (e.g. via a suitable communication path, such as a wireless communication path or a wired communication path), and capable of providing audio output of an audio signal. For instance, the second user device can be a speaker device, headset (e.g. wireless headset), headphones (e.g. wireless headphones), earbuds (e.g. wireless earbuds), and/or other suitable user device. In some implementations, the first and second user devices can be configured to coordinate playback of the audio signal (e.g. by the second audio device) and a tactile bass response representation associated with the audio signal (e.g. by the first audio device), such that the playback of the audio signal and the tactile bass response representation are substantially synchronized.

More particularly, the first user device can determine a playback delay associated with an output of a first audio signal by the first user device and an output of the first audio signal by the second user device. The playback delay can correspond to an amount of time. For instance, the first audio signal can be output on both the first user device and the second user device. In this manner, the first user device can cause the second user device to audibly output the first audio signal by transmitting data indicative of the first audio signal to the second user device. The first user device can simultaneously (e.g. substantially simultaneously to providing the data indicative of the first audio signal to the second user device) initiate an output of the first audio signal by the first user device. In some implementations, the first audio signal can correspond to multiple different audio signals. For instance, the audio signal output by the first user device can be a different audio signal from the audio signal output by the second user device. In this manner, the first user device can be configured to cause an output of a response indicative of the first audio signal by the first user device, and to cause an output of the first audio signal by the second user device. The first user device can then determine the playback delay of the first audio signal between the first and second user devices.

For instance, the playback delay can be caused by a propagation delay associated with an amount of time required for the data indicative of the first audio signal to travel from the first user device to the second user device via the communication path. The propagation delay can further be affected by the re-transmission of bad or lost data between the first and second user devices. Propagation delay can further be affected by changing channel conditions, for instance, in mobile applications where the first user device communicates wirelessly with the second user device. The playback delay can further be caused by local processing delays on the first user device and/or the second user device.

In some implementations, the playback delay can be determined using an input transducer associated with the first user device. For instance, the input transducer can be configured to detect sounds outputted by the second user device. The playback delay can then be determined based at least in part on the detect sounds. In some implementations, the playback delay can be determined using an input transducer associated with the second user device. In some implementations, the playback delay can be determined based at least in part on an acknowledgement message provided by the second user device. For instance, upon receiving data indicative of the first audio signal, the second user device can provide an acknowledgement message to the first user device via the communication path (e.g. via an audio channel and/or a control channel associated with the communication path). The playback delay can be determined based at least in part on the acknowledgement message.

As indicated, a coordination of an output of a second audio signal by the second user device and a tactile bass response representation associated with the second audio signal by the first audio device can be determined based at least in part on the playback delay. The coordination can be determined, such that the outputs are substantially synchronized. As used herein, the term "substantially synchronized" can refer to an output of the second audio signal by the second user device that occurs within an acceptable delay threshold from an output of the tactile bass response representation by the first user device. The acceptable delay threshold can be an amount of time or a time interval, such that a delay between two or more outputs that are separated by an amount of time less than or equal to the acceptable delay threshold is not noticeable by a human user.

Upon a selection of a second audio signal by a user for output by the first and second user devices, a tactile bass response representation associated with the second audio signal can be generated. In some implementations, the second audio signal can be the same audio signal as the first audio signal. In some implementations, the second audio signal can be a different audio signal than the first audio signal. For instance, the first audio signal can be a test signal used to determine a playback delay to be implemented upon a selection of a second audio signal by the user for playback.

In some implementations, the tactile bass response representation can be generated by applying the second audio signal to one or more equalization filters to attenuate one or more frequencies in the second audio. For instance, the equalization filters can be configured to attenuate frequencies outside of the bass frequency range (e.g. 60 Hz to 250 Hz), and/or the sub-bass frequency range (e.g. 16 Hz to 60 Hz). It will be appreciated that various suitable filter configurations can be used to attenuate various suitable frequencies. In this manner, the tactile bass response representation can be an equalized and/or filtered second audio signal.

In some implementations, the tactile bass response representation can include one or more haptic signals provided by one or more haptic actuators associated with the first user device. For instance, the haptic actuator can be a linear motor actuator, an eccentric motor actuator, and/or other suitable haptic actuator. Operation of the haptic actuator(s) can be controlled to provide one or more haptic signals corresponding to a bass portion of the second audio signal. In this manner, the tactile bass response representation can include haptic signals that mimic the bass portion of the second audio signal. For instance, in some implementations, the frequency spectrum of the audio signals can be analyzed to detect one or more signal peaks or impulses in the bass frequency range. Operation of haptic actuator(s) can be controlled to provide haptic signals corresponding to the detected peaks or impulses.

The output of the tactile bass response representation by the first user device can be coordinated with the output of the second audio signal by the second user device to substantially synchronize the outputs. The coordination can be performed by applying the playback delay to the output of the tactile bass response representation, such that the first user device is configured to output the tactile bass response representation subsequent to an amount of time equal to the playback delay. For instance, the first user device can provide data indicative of the second audio signal to the second user device for output of the second audio signal by the second user device. The first user device can then apply the playback delay by delaying an output of the tactile bass response representation by the first user device based at least in part on the playback delay, such that the first user device outputs the tactile bass response representation in a substantially synchronized manner with the output of the second audio signal by the second user device. In some implementations, the first user device can simply wait to initiate the output of the tactile bass response representation by a period of time equal to the playback delay. In some implementations, the first user device can encode the playback delay into one or more signals controlling the output of the tactile bass response representation. For instance, the first user device can control operation of the playback, such that the playback is initiated subsequent to the playback delay. In some implementations, the first user device can pad the beginning of the tactile bass response representation with null data, and/or data indicative of no output or silent output based at least in part on the playback delay, such that the output of the tactile bass response representation by the first user device includes the padded portion of the tactile bass response representation.

In some implementations, the second audio signal can be further provided to one or more equalization filters associated with the second user device. The equalization filters associated with the second user device can be configured to attenuate bass frequencies associated with the second audio signal. In this manner, the filtered second audio signal can be outputted by the second user device, such that second user device outputs less bass frequencies. Such equalization technique can conserve battery resources. In some implementations, a volume associated with output of the second audio signal and/or the tactile bass response representation can be coordinated. For instance, in some implementations, the user can select a volume on the first user device or the second user device, and the volume of the other user device can be adjusted to match the selected volume. In some implementations, the volume of the first user device can be adjusted based at least in part on a position of the first user device with respect to the user. For instance, the volume of the first user device can be adjusted based on whether the first user device is in a pocket of the user, in the user's hand, not being held by the user, etc. Similarly, in some implementations, the volume of the second user device can be adjusted based at least in part on a position of the second user device relative to the user. For instance, in implementations wherein the second user device is a headset, the volume of the second user device can be adjusted based on whether the second user device is in the user's ear, out of the user's ear, around the neck of the user, etc. For instance, the position of the first user device and/or the second user device can be determined based at least in part on one or more positioning sensors respectively associated with the first and/or second user devices. For instance, the one or more sensors can include inertial measurement units.

Figure 1:
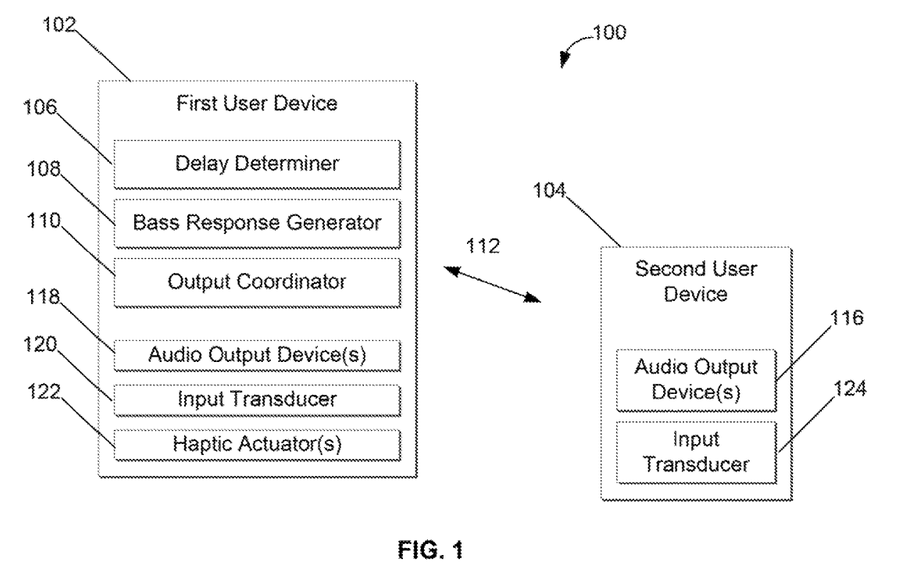
FIG. 1 depicts an example system for providing a tactile bass response according to example embodiments of the present disclosure.

With reference now to the figures, example aspects of the present disclosure will be discussed in greater detail. For instance, FIG. 1 depicts an example system 100 for providing tactile bass response associated with audio signals according to example embodiments of the present disclosure. The system 100 includes a first user device 102 and a second user device 104. The first user device 102 can include any suitable user device, such as a smartphone, tablet, laptop computer, desktop computer, wearable computing device, etc. The second user device 104 can, for instance, be a device capable of audibly outputting audio signals, such as a speaker device, headset, etc.

The first user device 102 includes a delay determiner 106, a bass response generator 108, and an output coordinator 110. The delay determiner 106 can be configured to determine a playback delay between an output of audio by the first user device 102 and an output of audio by the second user device 104. The playback delay can correspond to a difference in time required for the second user device 104 to output an audio signal compared to the first user device 102 when the output is initiated by the first user device 102. The audio signal can be selected by the user. In some implementations, the audio signal can be a test audio signal used to determine the playback delay. For instance, the first user device 102 can initiate an output of the audio signal by the second user device by providing data indicative of the audio signal to the second user device 104 via a communication path 112. The communication path 112 can be a wireless communication path or a wired communication path. In implementations, wherein the communication path 112 is a wireless communication path, the communication path can be implemented using various suitable wireless communication techniques, such as Bluetooth, Wi-Fi, Wi-Fi direct, near field communication, infrared communication, etc. Upon receiving the data indicative of the audio signal via the communication path 112, the second user device 104 can output the audio signal via one or more audio output devices 116 (e.g. speaker) associated with the second user device.

The first user device 102 can further initiate an output of the audio signal by an audio output device 118 associated with the first user device, for instance, by providing data indicative of the audio signal to the audio output device 118. For instance, the first user device 102 can initiate the output of the audio signal by the audio output device 118 substantially simultaneously to initiating the output of the audio signal by the second user device 104. In this manner, the first user device 102 can provide the data indicative of the audio signal to the audio output device 118 substantially simultaneously to providing the data indicative of the audio signal to the second user device 104. The playback delay can be determined based at least in part on the timing of the outputs of the audio signal by the first user device 102 and the second user device 104.

Figure 2:
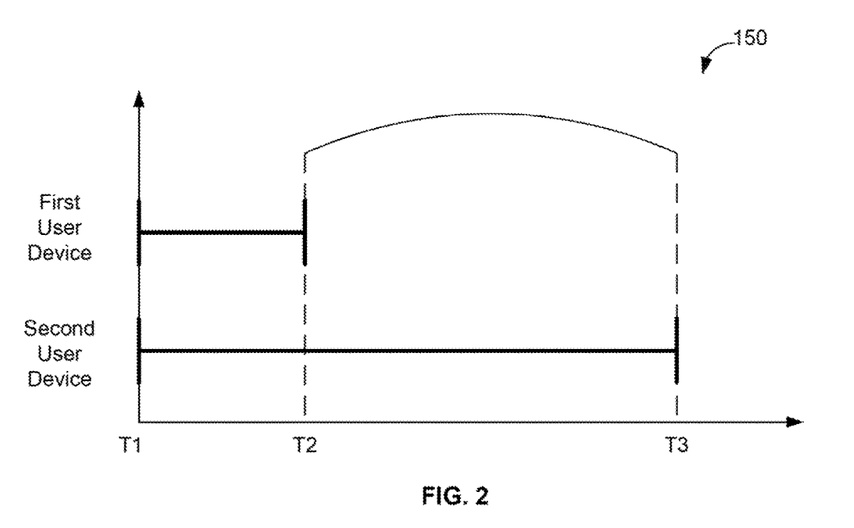
FIGS. 2-4 depict graphical representations of example output timings according to example embodiments of the present disclosure.

For instance, FIG. 2 depicts a graphical representation of an example output timing 150 by the first user device 102 and the second user device 104 according to example embodiments of the present disclosure. For instance, the first user device 102 can initiate an output of an audio signal by the first user device 102 and by the second user device 104 at time T1. In this manner, at time T1, the first user device 102 can provide data indicative of the audio signal to audio output device 118, and to the second user device 104. The first user device 102 can output (e.g. audibly output) the audio signal at time T2. The delay between time T1 and Time T2 can be caused, for instance, by local processing delays and/or other delays associated with the output of the audio signal by the first user device 102. The second user device 104 can output (e.g. audibly output) the audio signal at time T3. The delay between time T3 and Time T1 can be caused, for instance, by transmission and/or propagation delays associated with the transmission of the data indicative of the audio signal via the communication path 112, local processing delays associated with the output of the audio signal by the second user device 104, and/or other delays. The playback delay can correspond to an amount of time between T2 and T3. In this manner, the playback delay can correspond to an amount of time equal to the difference in time required for the first user device 102 to output the audio signal compared to the second user device 104.

Referring back to FIG. 1, the playback delay can be determined, for instance, using an input transducer 120 associated with the first user device 102. For instance, the input transducer 120 can be a microphone, or other suitable input transducer capable of "sensing" or detecting sounds. In this manner, upon an audible output of the audio signal by the second user device 104, the input transducer 120 can sense or detect the sound associated with the audio signal as output by the second user device 104. The delay determiner 106 can then determine the playback delay based at least in part on the detected sound. For instance, the delay determiner 106 can subtract the time at which the sound is detected by the input transducer 120 to the time T2 (e.g. the time at which the first user device 102 outputs the audio signal) to determine the playback delay. In some implementations, the playback delay can be determined based at least in part on an input transducer 124 associated with the second user device 104. For instance, upon an audible output of the audio signal by the second user device 104, the input transducer 124 can sense or detect the sound associated with the audio signal as output by the second user device 104. Data associated with the detected sound (e.g. timing information associated with the detected sound) can be provided to the first user device 102. The delay determiner 106 can then determine the playback delay based at least in part on the data associated with the detected sound.

In some implementations, the delay determiner 106 can determine the playback delay based at least in part on an acknowledgement message provided to the first user device 102 by the second user device 104 in response to receiving data indicative of the audio signal. For instance, the acknowledgement message can include a timestamp indicative of a time of receipt of the data. The acknowledgement message can be provided via the communication path 112. For instance, in some implementations, the acknowledgement message can be provided via a control channel associated with the communication path 112. In some implementations, the acknowledgement message can be provided via an audio channel associated with the communication path 112.

The bass response generator 108 can be configured to generate a tactile bass response representation associated with a second audio signal. For instance, the second audio signal can be selected by the user to be outputted by the first user device 102 and/or the second user device 104. In some implementations, the tactile bass response representation can be a filtered and/or equalized audio signal corresponding to second audio signal. In such implementations, the bass response generator 108 can generate the tactile bass response representation by applying the second audio signal to one or more equalization filters implemented within the first user device 102. For instance, the one or more equalization filters can include one or more multi-band equalizers, band pass filters, DC notch filters, high pass filters, high shelf filters, low pass filters, low shelf filters, notch filters, parametric equalizers, and/or any other suitable filters. The one or more equalization filters can be configured to attenuate high frequencies of the second audio signal. It will be appreciated that the filters and be configured and/or arranged in various manners to generate the tactile bass response representation. For instance, the one or more equalization filters can be configured to attenuate non-bass frequencies (e.g. frequencies above 250 Hz) in the second audio signal. The output of the one or more equalization filters can be a filtered second audio signal. In this manner, the tactile bass response representation can be the filtered second audio signal.

In some implementations, the tactile bass response representation can include one or more haptic signals associated with one or more haptic actuators 122 associated with the first user device. For instance, the haptic signals can be determined to correspond to the bass frequencies within the audio signal. In this manner, an output of the tactile bass response representation can include an output of one or more haptic signals by the haptic actuators 122 that are coordinated with the bass frequencies of the second audio signal. For instance, such tactile bass response representation can be determined by detecting one or more peaks or impulses within the bass frequency range of the second audio signals. The peaks can be detected using one or more suitable peak detection algorithms. For instance, the peaks or impulses can include portions of the second audio signal within the bass frequency range having amplitudes above a threshold. The bass response generator 108 can determine the tactile bass response representation based at least in part on the detected peaks or impulses. The bass response generator 108 can control operation of the haptic actuator(s) 122 such that the haptic actuators 122 provide haptic signals that correspond to the detected peaks or impulses. For instance, the timing of the haptic signals can correspond to the timing of the peaks or impulses. The intensity of the haptic signals can correspond to the amplitude of the detected peaks or impulses. In this manner, the tactile bass response representation can correspond to the bass configuration of the second audio signal, to provide a representation of the bass configuration as the second audio signal is output.

Upon a determination of the tactile bass response representation, the output coordinator 110 can coordinate the output of the second audio signal and the tactile bass response representation to synchronize the outputs by the first user device 102 and the second user device 104. In particular, the output coordinator can coordinate the outputs based at least in part on the playback delay. For instance, the output coordinator 110 can control the timing of the outputs based at least in part on the playback delay, such that the outputs are substantially synchronized between the user devices.

Figure 3:
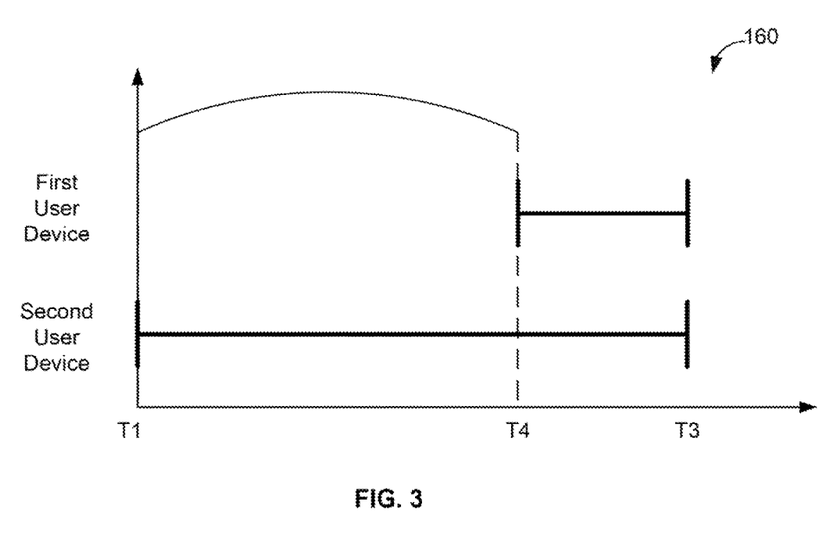

It will be appreciated that the output coordinator 110 can coordinate the outputs of the first user device 102 and the second user device 104 in various suitable manners with the object of synchronizing the outputs. In some implementations, the output coordinator 110 can coordinate the outputs by withholding the provision of the data indicative of the tactile bass response representation to the audio output device 118 and/or the haptic actuator(s) 122 relative to the provision of the data indicative of the second audio signal to the second user device 104 based at least in part on the output delay. For instance, FIG. 3 depicts an example graphical representation of an output timing 160 to provide substantially synchronized outputs according to example embodiments of the present disclosure. The output coordinator 110 can arrange for data indicative of the second audio signal to be provided to the second user device 104 at time T1. The output coordinator 110 can further arrange for data indicative of the tactile bass response representation to be provided to the audio output device 118 and/or the haptic actuator(s) 122 at time T4. Time T4 can be determined based at least in part on time T1 and the playback delay. For instance, as shown, the time T4 can occur subsequent to time T1 by a period of time equal to the playback delay. In this manner, the coordination can be performed with an object of causing the first user device 102 and the second user device 104 to respectively output the tactile bass response representation and the second audio signal in a substantially synchronized manner at time T3.

Figure 4:
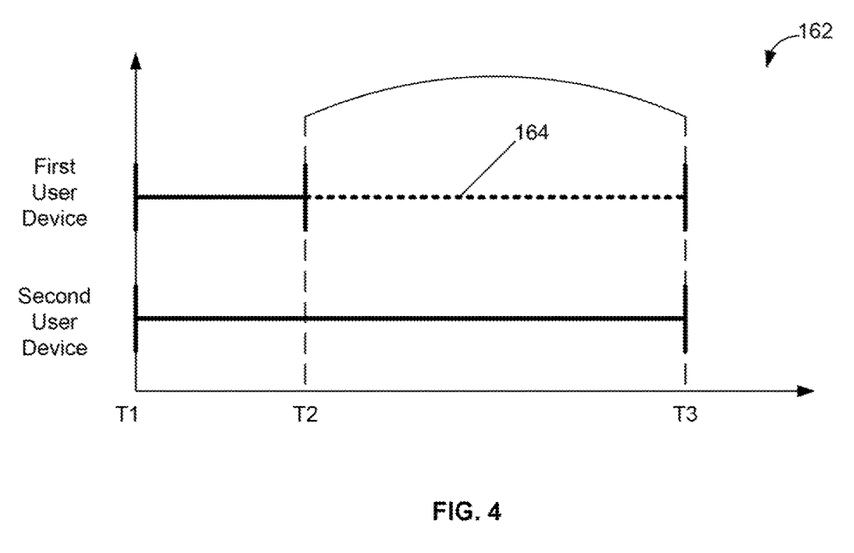

In some implementations, the output coordinator 110 can encode the playback delay into the data indicative of the tactile bass response representation, or within one or more signals controlling the output of the tactile bass response representation. For instance, FIG. 4 depicts a graphical representation of an example output timing 162 according to example embodiments of the present disclosure. The output coordinator 110 can arrange for the data indicative of the tactile bass response representation to be provided to the audio output device 118 and/or the haptic actuator(s) 122 at time T1, and for the data indicative of the second audio signal to be provided to the second user device 104 at time T1. The output coordinator 110 can further pad the data indicative of the tactile bass response representation with null data 164 or other data, such that the first user device 102 begins outputting null data 164 at time T2. The null data 164 can correspond to an amount of time equal to the playback delay. In this manner, the first user device 102 can output the null data 164 until time T3. The first user device 102 can then begin outputting the tactile bass response representation at time T3, when the second user device 104 is expected to begin outputting the second audio signal.

Referring back to FIG. 1, in some implementations, the bass response generator 108 can be configured to determine at least a portion of the tactile bass response representation in real time or near real time. In such implementations, peak detection can be initiated on the second audio signal concurrently with the provision of the data indicative of the second audio signal to the second user device 104. For instance, the second audio signal can be provided to the one or more peak detection algorithms at time T1 depicted in FIGS. 2-4. The data indicative of the second audio signal can further be provided to the second user device 104 at time T1. The bass response generator can then determine one or more haptic signals for each detected peak in response to the occurrence of the detected peak. The output coordinator 110 can then apply the playback delay to the determined haptic signals, such that the haptic actuator(s) 122 output the haptic signals subsequent to a period of time equal to the playback delay. In this manner, the haptic signals can be substantially synchronized with the output of the second user device 104.

In some implementations, the tactile bass response representation can include one or more haptic signals and an output of the filtered second audio signal having attenuated non-bass frequencies. In this manner, output of the tactile bass response representation can be performed by the audio device 118 and the haptic actuator(s) 122. In such implementations, the determination of the haptic signals, and the output of the haptic signals and the filtered audio signal can be coordinated in various suitable manners.

Figure 5:
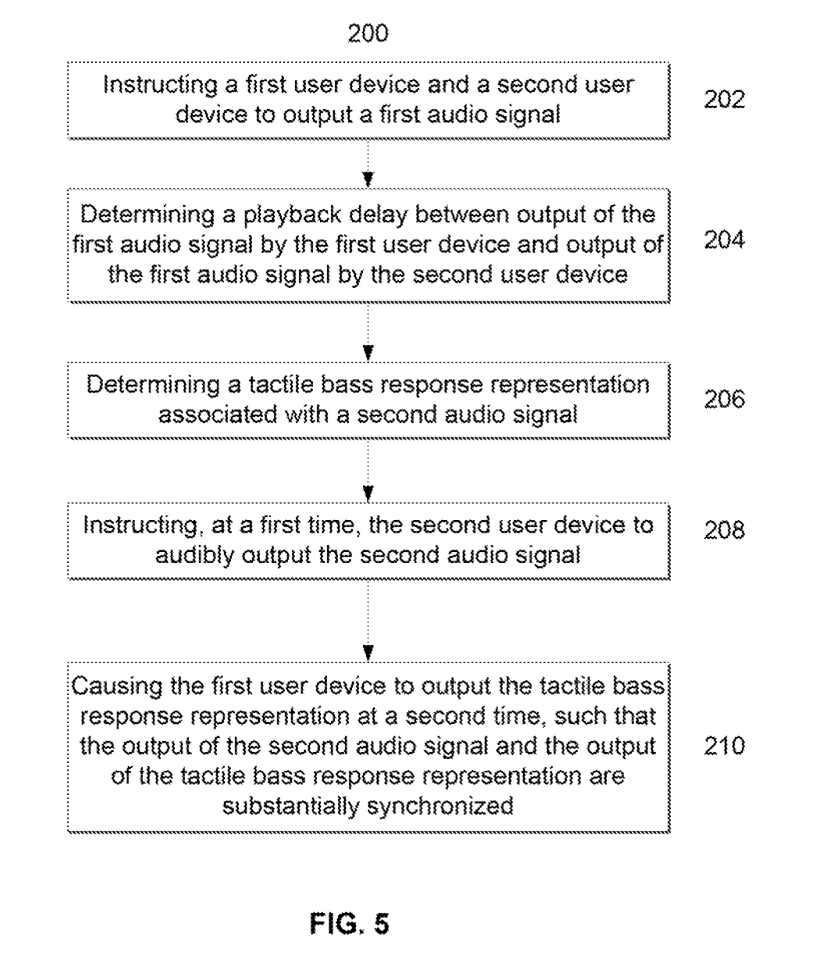
FIG. 5 depicts a flow diagram of an example method of providing tactile bass response according to example embodiments of the present disclosure.

FIG. 5 depicts a flow diagram of an example method (200) of providing tactile bass response according to example embodiments of the present disclosure. Method (200) can be implemented by one or more computing devices, such as one or more of the computing devices depicted in FIG. 6. In particular implementations, method (200) can be implemented by the delay determiner 106, bass response generator 108, and the output coordinator 110 depicted in FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include instructing a first user device and a second user device to output a first audio signal. For instance, data indicative of the first audio signal and instructions to output the first audio signal can be provided to the first user device and the second user device. The instructions can be provided substantially simultaneously (e.g. at the same time, or substantially at the same time). In some implementations, the first user device can provide the instructions to an audio output device implemented within the first user device and to the second user device.

At (204), method (200) can include determining a playback delay between the output of the first audio signal by the first user device and an output of the first audio signal by the second user device. As indicated, the output by the second user device may be delayed relative to the output of the first user device due at least in part on a transmission or propagation delay, a processing delay associated with the first or second user device, and/or other delays. In some implementations, the playback delay can be determined based at least in part on an audible output of the first audio signal by first user device and/or the second user device. The audible outputs can be detected or sensed by an input transducer associated with the first and/or second user device. For instance, the output of the second user device can be detected by a transducer associated with the first user device, and the timing of the detection can be compared to a timing of the output by the first user device. As another example, the output of the second user device can be detected by an input transducer associated with the second user device, and data indicative of the detection can be provided to the first user device to determine the playback delay.

In some implementations, the playback delay can be determined based at least in part on an acknowledgement message provided by the second user device to the first use device in response to a receipt of the data indicative of the first audio signal. For instance, a timestamp indicative of a time of receipt of the data indicative of the first audio signal can be included within the acknowledgement message and compared to a time of the output of the first audio signal by the second user device and/or the first user device. It will be appreciated that the playback delay can be determined in various suitable manners without deviating from the scope of the present disclosure.

At (206), method (200) can include determining a tactile bass response representation associated with a second audio signal. In some implementations, the second audio signal can be selected for output by a user. In some implementations, the second audio signal can be the same audio signal as the first audio signal. The tactile bass response representation can be determined by filtering the second audio signal to attenuate frequencies that are not in the bass frequency range (e.g. 60 Hz to 250 Hz). In this manner, the second audio signal can be provided to one or more equalization filters configured to attenuate such non-bass frequencies. In some implementations, the tactile bass response representation can include one or more haptic signals to be output by one or more haptic actuators associated with the first user device. In some implementations, the haptic actuator(s) can be separate from the first user device. For instance, the haptic actuator(s) can be implemented within another device that is in communication with the first user device. The first user device can provide data indicative of the tactile bass response representation to the separate device to instruct the separate device to output the tactile bass response representation (e.g. the haptic signals).

At (208), method (200) can include instructing the second user device to audibly output the second audio signal. In particular, the instructions can be provided to the second user device at a first time. In this manner, the first user device may provide data indicative of the second audio signal to the second use device at the first time.

At (210), method (200) can include causing the first user device to output the tactile bass response representation at a second time. The second time can be a subsequent time to the first time. The second time can be determined based at least in part on the playback delay. In this manner, the outputs of the first and second user devices can be coordinated, such that the output of the tactile bass response is temporally correlated (e.g. substantially synchronized) to the output of the second audio signal. In some implementations, the coordination can be performed by withholding a provision of instructions for the first user device to output the tactile bass response based on the playback delay. For instance, the instructions can be provided at a third time that is between the first time and the second time. The third time can be determined based at least in part on the playback delay. In some implementations, the coordination can be performed by padding the data indicative of the tactile bass response with null data, such that the null data is output prior to an output of the tactile bass response representation. The null data can be determined based at least in part on the playback delay. It will be appreciated that the coordination of the outputs can be performed in various suitable manners, with the object of synchronizing the outputs.

Figure 6:
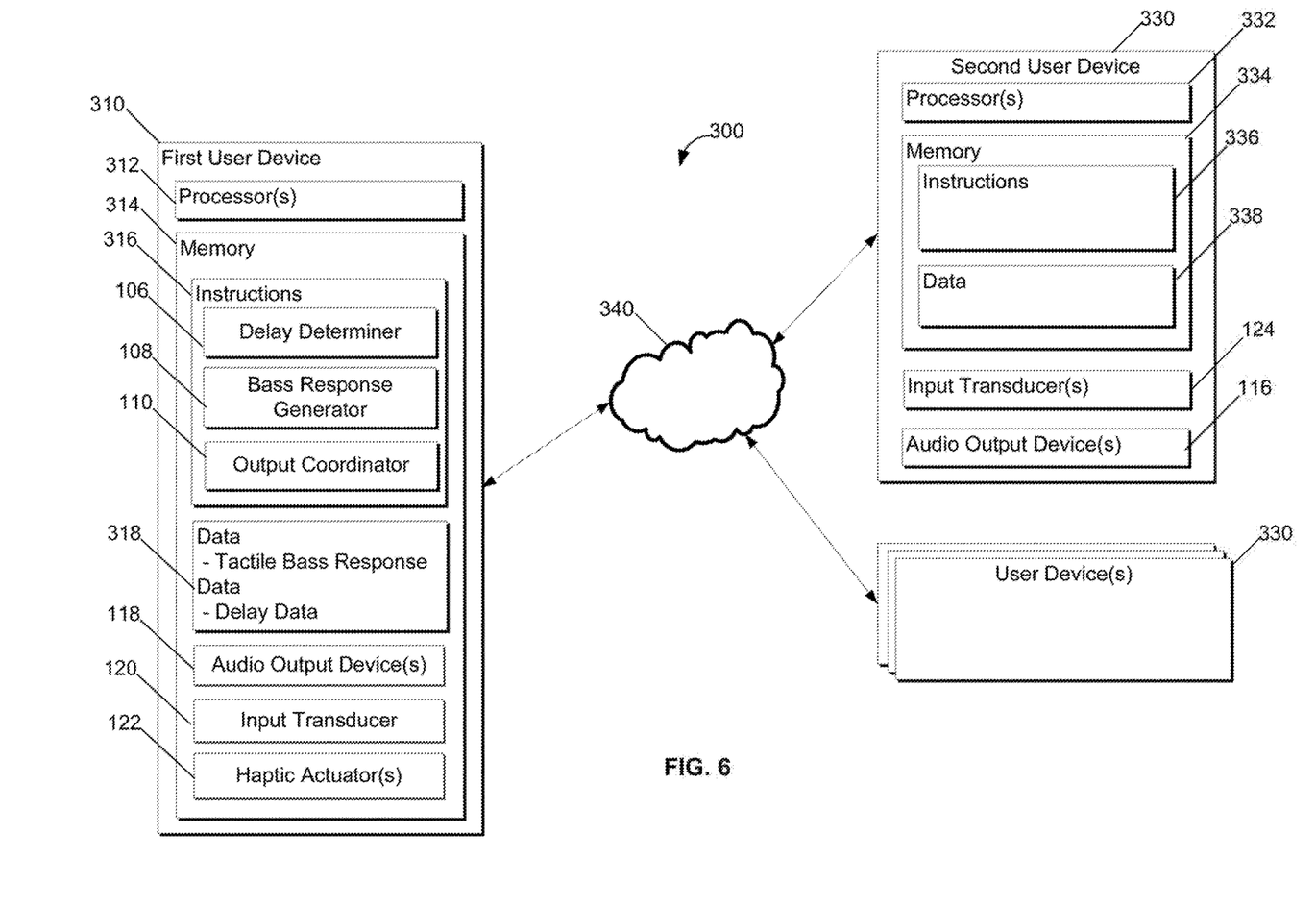
FIG. 6 depicts an example system according to example embodiments of the present disclosure.

FIG. 6 depicts an example computing system 300 that can be used to implement the methods and systems according to example aspects of the present disclosure. The system 300 can be implemented using a client-server architecture that includes a first user device 310 that communicates with one or more second user devices 330 over a network 340. The system 300 can be implemented using other suitable architectures, such as a single computing device.

The system 300 includes a first user device 310. The first user device 310 can be any suitable computing device, such as a smartphone, tablet, desktop computer, laptop computer, wearable computing device, haptic actuator, etc. The first user device 310 can have one or more processors 312 and one or more memory devices 314. The first user device 310 can also include a network interface used to communicate with one or more second user devices 330 over the network 340. The network interface can include any suitable components for interfacing with one more networks, including for example, transmitters, receivers, ports, controllers, antennas, or other suitable components.

The one or more processors 312 can include any suitable processing device, such as a central processing unit, microprocessor, microcontroller, integrated circuit, logic device, or other suitable processing device. The one or more memory devices 314 can include one or more computer-readable media, including, but not limited to, non-transitory computer-readable media, RAM, ROM, hard drives, flash drives, or other memory devices. The one or more memory devices 314 can store information accessible by the one or more processors 312, including computer-readable instructions 316 that can be executed by the one or more processors 312. The instructions 316 can be any set of instructions that when executed by the one or more processors 312, cause the one or more processors 312 to perform operations. For instance, the instructions 316 can be executed by the one or more processors 312 to implement the delay determiner 106, the bass response generator 108, and the output coordinator 110 depicted in FIG. 1.

As shown in FIG. 6, the one or more memory devices 314 can also store data 318 that can be retrieved, manipulated, created, or stored by the one or more processors 312. The data 318 can include, for instance, tactile bass response data, delay data, and other data. The data 318 can be stored locally on the first user device 310 and/or in one or more databases. The one or more databases can be connected to the first user device 310 by a high bandwidth LAN or WAN, or can also be connected to first user device 310 through network 340. The one or more databases can be split up so that they are located in multiple locales.

The first user device 310 can include various input/output devices for providing and receiving information from a user, such as one or more audio output devices 118, input transducers 120, one or more haptic actuators 122 touch screen, touch pads, data entry keys, speakers, and/or microphones suitable for voice recognition. For instance, the first user device 310 can have a display device for presenting a user interface according to example aspects of the present disclosure.

The first user device 310 can exchange data with one or more second user devices 330 over the network 340. It will be appreciated that any number of second user devices 330 can be connected to the first user device 310 over the network 340. Each of the second user devices 330 can be any suitable type of computing device, such as a speaker device, audio output device, headset device, general purpose computer, special purpose computer, laptop, desktop, mobile device, navigation system, smartphone, tablet, wearable computing device, a display with one or more processors, or other suitable computing device.

Similar to the first user device 310, a second user device 330 can include one or more processor(s) 332 and a memory 334. The one or more processor(s) 332 can include one or more central processing units (CPUs), microprocessors, microcontrollers, integrated circuits, logic devices, and/or other processing devices. The memory 334 can include one or more computer-readable media and can store information accessible by the one or more processors 332, including instructions 336 that can be executed by the one or more processors 332 and data 338. For instance, the memory 334 can store instructions 336 for implementing example aspects of the present disclosure.

The second user device 330 of FIG. 6 can include various input/output devices for providing and receiving information from a user, such as one or more audio output devices 116, input transducers 124, touch screens, touch pads, data entry keys, speakers, and/or a microphone suitable for voice recognition.

The second user device 330 can also include a network interface used to communicate with one or more remote computing devices (e.g. first user device 310) over the network 340. The network interface can include any suitable components for interfacing with one more networks, including for example, transmitters, receivers, ports, controllers, antennas, or other suitable components.

The network 340 can be any type of communications network, such as a local area network (e.g. intranet), wide area network (e.g. Internet), cellular network, or some combination thereof. The network 340 can also include a direct connection between a second user device 330 and the first user device 310. In general, communication between the first user device 310 and a second user device 330 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing tactile bass response to one or more user devices, the method comprising:
   causing, by one or more processors, a first user device to output a response indicative of first audio signal, and causing a second user device to output the first audio signal;
   determining, by the one or more processors, a playback delay between the output of the first audio signal by the first user device and the output of the first audio signal by the second user device based at least in part on an a timestamp provided to the first user device by the second user device, the timestamp indicative of a time the second user device receives the first audio signal;

at a first time, causing, by the one or more processors, the second user device to output a second audio signal; and causing, by the one or more processors, the first user device to execute a tactile bass response representation associated with the second audio signal, such that the tactile bass response is executed at a second time, the second time being determined based at least in part on the temporal delay, wherein causing, by the one or more processors, the first user device to execute a tactile bass response representation comprises controlling, by the one or more processors, operation of one or more haptic actuators associated with the first user device based at least in part on the tactile bass response representation, to enhance a frequency spectrum of the second audio signal in the bass frequency range.

2. The computer-implemented method of claim 1, wherein causing the first user device to output the first audio signal occurs substantially simultaneously to causing the second user device to output the first audio signal.

3. The computer-implemented method of claim 1, wherein causing, by one or more processors, a first user device to output a first audio signal, and causing a second user device to output the first audio signal comprises causing the first user device to output the first audio signal by a speaker device associated with the first user device, and causing the second user device to output the first audio signal by a speaker device associated with the second user device.

4. The computer-implemented method of claim 1, wherein determining, by the one or more processors, a playback delay comprises determining the playback delay based at least in part on an input transducer associated with the first or second user device.

5. The computer-implemented method of claim 1, further comprising generating, by the one or more processors, the tactile bass response representation associated with the second audio signal.

6. The computer-implemented method of claim 5, wherein generating, by the one or more processors, a tactile bass response representation comprises applying the second audio signal to one or more equalization filters configured to eliminate or reduce audio frequencies associated with the second audio signal that are above a threshold.

7. The computer-implemented method of claim 6, wherein causing, by the one or more processors, the first user device to execute a tactile bass response representation comprises causing the first user device to output the generated tactile bass response representation by a speaker device associated with the first user device.

8. The computer-implemented method of claim 5, wherein generating, by the one or more processors, a tactile bass response representation comprises detecting, by the one or more processors, one or more peaks or impulses associated with the second audio signal that are below a frequency threshold.

9. The computer-implemented method of claim 1, wherein the first audio signal and the second audio signal are the same audio signal.

10. The computer-implemented method of claim 1, wherein the second time is different than the first time.

11. A computing system, comprising:
one or more processors; and
one or more memory devices, the one or more memory devices storing computer-readable instructions that when executed by the one or more processors cause the one or more processors to perform operations, the operations comprising:

causing a first user device to output a first audio signal, and causing a second user device to output the first audio signal;

determining a playback delay between the output of the first audio signal by the first user device and the output of the first audio signal by the second user device based at least in part on an a timestamp provided to the first user device by the second user device, the timestamp indicative of a time the second user device receives the first audio signal;

causing, at a first time, the second user device to output a second audio signal; and causing the first user device to execute a tactile bass response representation associated with the second audio signal, such that the tactile bass response is executed at a second time, the second time being determined based at least in part on the temporal delay, wherein causing the first user device to execute a tactile bass response representation comprises controlling an operation of one or more haptic actuators associated with the first user device based at least in part on the tactile bass response representation, to enhance a frequency spectrum of the second audio signal in the bass frequency range.

12. The computing system of claim 11, wherein causing the first user device to output the first audio signal occurs substantially simultaneously to causing the second user device to output the first audio signal.

13. The computing system of claim 11, wherein causing a first user device to output a first audio signal, and causing a second user device to output the first audio signal comprises causing the first user device to output the first audio signal by a speaker device associated with the first user device, and causing the second user device to output the first audio signal by a speaker device associated with the second user device.

14. The computing system of claim 11, wherein determining a playback delay comprises determining the playback delay based at least in part on an input transducer associated with the first or second user device.

15. The computing system of claim 11, the operations further comprising generating the tactile bass response representation associated with the second audio signal.

16. One or more tangible, non-transitory computer-readable media storing computer-readable instructions that when executed by one or more processors cause the one or more processors to perform operations, the operations comprising:

causing a first user device to output a first audio signal, and causing a second user device to output the first audio signal;

determining a playback delay between the output of the first audio signal by the first user device and the output of the first audio signal by the second user device based at least in part on an a timestamp provided to the first user device by the second user device, the timestamp indicative of a time the second user device receives the first audio signal;

causing, at a first time, the second user device to output a second audio signal; and causing the first user device to execute a tactile bass response representation associated with the second audio signal, such that the tactile bass response is executed at a second time, the second time being determined based at least in part on the temporal delay, wherein causing the first user device to execute a tactile bass response representation comprises controlling an operation of one or more haptic actuators associated with the first user device based at least in part on the tactile bass response representation, to enhance a frequency spectrum of the second audio signal in the bass frequency range.

17. The one or more tangible, non-transitory computer-readable media of claim 16, the operations further comprising generating, by the one or more processors, the tactile bass response representation associated with the second audio signal.

18. The one or more tangible, non-transitory computer-readable media of claim 17, wherein generating a tactile bass response representation comprises applying the second audio signal to one or more equalization filters configured to eliminate or reduce audio frequencies associated with the second audio signal that are above a threshold.

19. The one or more tangible, non-transitory computer-readable media of claim 17, generating a tactile bass response representation comprises detecting, by the one or more processors, one or more peaks or impulses associated with the second audio signal that are below a frequency threshold.

* * * * *